United States Patent [19]

Isono

[11] 4,444,406
[45] Apr. 24, 1984

[54] FRONT WHEEL SUSPENSION FOR MOTORCYCLES

[75] Inventor: Tokio Isono, Tokyo, Japan

[73] Assignee: Honda Giken Kogyo Kabushiki Kaisha, Tokyo, Japan

[21] Appl. No.: 333,463

[22] Filed: Dec. 22, 1981

[30] Foreign Application Priority Data

Dec. 25, 1980 [JP] Japan ................... 55/184555

[51] Int. Cl.³ .................................. B62K 25/12
[52] U.S. Cl. ......................... 280/277; 280/279; 280/283; 280/286
[58] Field of Search ............... 280/277, 276, 275, 274, 280/279, 286, 688, 690, 696, 701, 283, 666, 667; 180/219, 218

[56] References Cited

U.S. PATENT DOCUMENTS

4,114,460  9/1978  Oto ........................... 280/276 X
4,212,481  7/1980  Ribi ........................... 280/276

FOREIGN PATENT DOCUMENTS

547788   3/1932  Fed. Rep. of Germany ...... 280/277
810847   8/1951  Fed. Rep. of Germany ...... 280/276
1102954  5/1955  France ........................... 280/277
2418742  11/1979 France ........................... 280/277
770216   3/1957  United Kingdom ............... 280/277
2075443  11/1981 United Kingdom ............... 280/277

Primary Examiner—Joseph F. Peters, Jr.
Assistant Examiner—Mitchell J. Hill
Attorney, Agent, or Firm—Irving M. Weiner; Pamela S. Burt; John L. Shortley

[57] ABSTRACT

A front wheel suspension for motorcycles including a pair of first linkages each having link members for interconnecting an upper fork pivotably supported on a motorcycle body and a lower fork supporting a front wheel thereon, and a pair of second linkages for restraining the deformation of the first linkages through a damper, the upper fork having a hollow formed therein in which at least a part of the second linkage is accommodated. The suspension has the moment of inertia relative to the handlebar substantially reduced and has a simplified and favorable appearance.

5 Claims, 8 Drawing Figures

FRONT WHEEL SUSPENSION FOR MOTORCYCLES

BACKGROUND OF THE INVENTION

1. Field of the Invention

The present invention relates to a front wheel suspension for motorcycles of the type which employs a linkage for suspending a front road wheel.

2. Relevant Art

A known front wheel suspension for motorcycles has been of a telescopic type wherein a front road wheel is suspended by a front fork including fork pipes and slidable bottom cases which constitute hydraulic shock absorbers. In some motorcycles, instead of such conventional telescopic type front wheel suspension, a linkage type front wheel suspension has been employed which has deformable quadrilateral linkages including a plurality of link members interconnecting an upper fork supported so as to be steerable on a motorcycle body and a lower fork supporting a front road wheel thereon, and which suspends the front road wheel by way of the deformation of the linkage restrained through a shock absorber. Such linkage type front wheel suspension for motorcycles has been known, for example, from U.S. Pat. No. 4,212,481, granted to Valentino Ribi, on July 15, 1980.

The present applicant has proposed, as disclosed in British Laid-Open Pat. No. 20 75 443, laid open on Nov. 18, 1981, which corresponds to U.S. Patent Application Ser. No. 243,052 filed Mar. 12, 1981, a linkage type front wheel suspension for motorcycles wherein a shock absorber is disposed between a pair of upper fork members and has one end thereof connected through pull rods to a pair of quadrilateral linkages including an upper fork, a lower fork and link members between the upper and lower forks.

In the aforesaid front wheel suspension structure proposed by the present applicant, however, the pull rods are externally exposed to be arranged on the outside of the upper fork.

The invention provides an improvement with respect to the aforesaid structure.

SUMMARY OF THE INVENTION

The present invention provides a front wheel suspension for a motorcycle which comprises a pair of first linkages having a pair of upper fork members pivotably supported so as to be steerable on a body of the motorcycle, a pair of lower fork members rotatably supporting a front wheel of the motorcycle, and two pairs of link members interconnecting the upper and lower fork members a damper is disposed between the upper fork members; a pair of second linkages each including at least one rod member operatively connects one end of the damper to either of the first linkages; and the upper fork members each include a hollow portion accommodating therein at least a part of either of the second linkages.

It is an object of the present invention to provide a front wheel suspension for motorcycles wherein the widthwise dimension of an upper fork is substantially reduced and hence the moment of innertia about the axis of steering is correspondingly reduced, which is particularly required for racing motorcycles.

It is another object of the invention to provide a front wheel suspension for motorcycles wherein a linkage for transmission of load between a shock absorber and a quadrilateral linkage is preferably kept from potential contact with external matter or from possible damage or other problems arising from such contact.

It is a further object of the invention to provide a front wheel suspension for motorcycles wherein a quadrilateral linkage and a linkage for transmission of load from the quadrilateral linkage to a shock absorber are disposed so as to be substantially coplanar to thereby eliminate an offset in a load transmission path between the quadrilateral linkage and the shock absorber.

It is a still further object of the invention to provide a front wheel suspension for motorcycles which is simplified and favorable in appearance.

The foregoing and other objects and advantages of the present invention will become apparent from the following description of a preferred embodimment of the invention made with reference to the accompanying drawings.

DETAILED DESCRIPTION OF THE INVENTION

Figure 1:
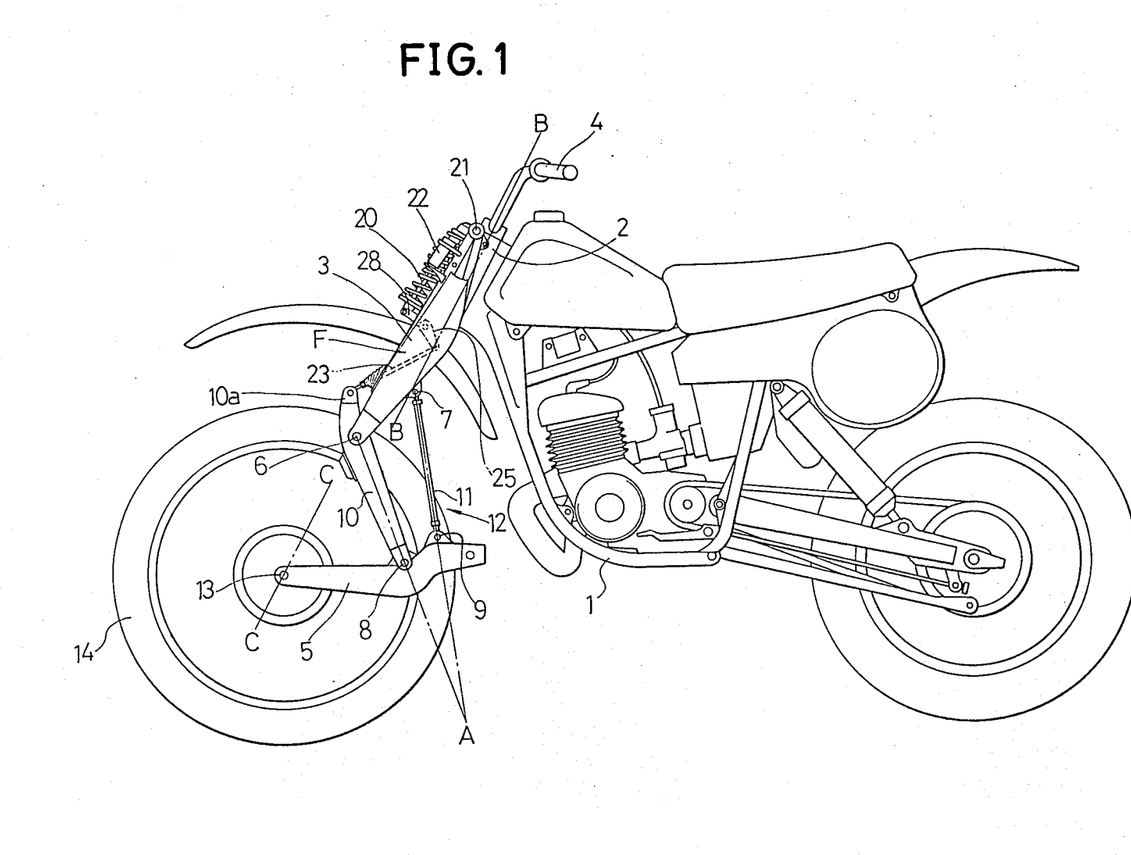
FIG. 1 is a general side elevational view of an exemplary motorcycle provided with a front wheel suspension according to the present invention.
Figure 2:
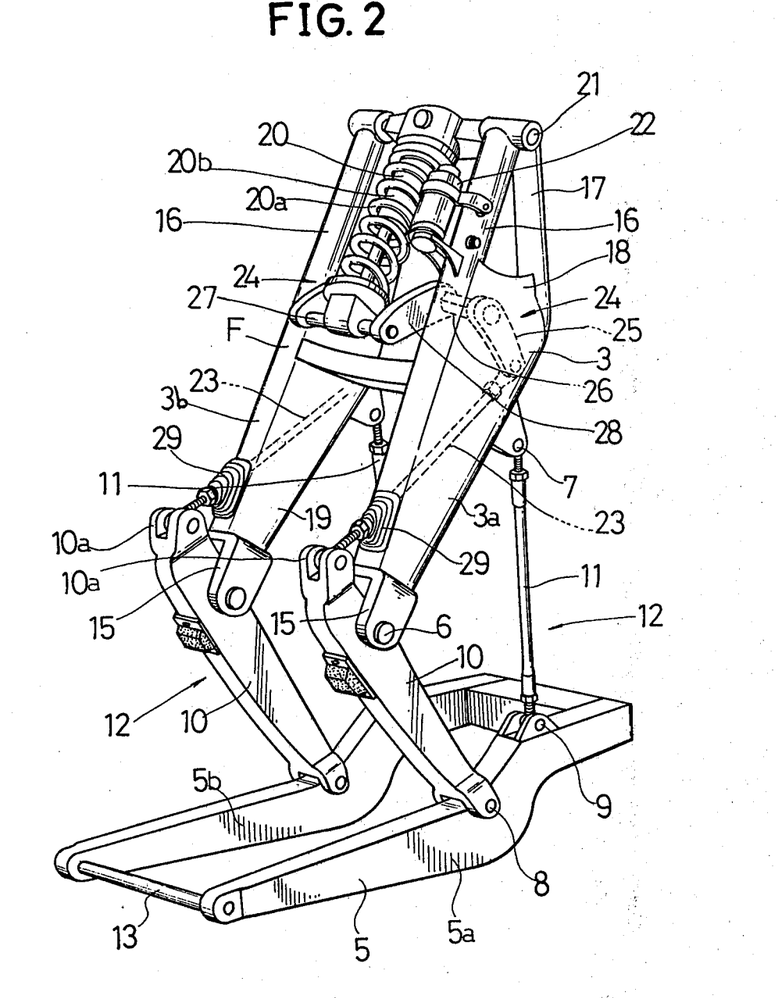
FIG. 2 is an enlarged perspective view of the suspension of FIG. 1.

Referring first to FIGS. 1 and 2, the motorcycle provided with the fromt wheel suspension according to the present invention includes a body frame 1 which has a head pipe 2 secured to the front end thereof. An upper fork 3 is pivotably mounted on the head pipe 2 so as to be turnable to the left or right. Thus, the upper fork 3 is adapted to be steerable by a handlebar 4. The upper fork 3 comprises, together with a lower fork 5, a front fork F which is a principal component of the front wheel suspension of the motorcycle. Both forks 3 and 5 are interconnected by a pair of front arms or link members 10 and a pair of rear arms or link members 11 which have their upper ends pivotally connected to the upper fork 3 by means of pins 6 and 7, respectively, and which have their lower ends pivotally connected to the lower fork 5 by means of pins 8 and 9, respectively. Thus, the suspension is arranged in the form of a pair of quadrilateral linkages 12 each of which includes the upper fork 3 as a stationary link, and the lower fork 5 and the arms 10, 11 as movable link members. A transverse axle 13 for a front road wheel 14 is mounted at the front end of the lower fork 5 which thus serves as a support member for the front road wheel 14.

As shown in FIG. 2, the upper and lower forks 3 and 5 include a pair of left and right side members 3a, 3b and 5a, 5b, respectively, and a set of the two front and rear arms 10 and 11 are disposed between a set of the left side members 3a and 5a and between another set of the right side members 3b and 5b, or in other words, the upper fork 3 and the lower fork 5 are interconnected by the two left and right sets of arms 10, 11. Thus, the front wheel suspension includes a pair of quadrilateral first linkages 12 disposed on left and right sides of the front road wheel 14, both linkages 12 having the same construction and being deformed in a similar manner. Each side member 3a, 3b of the upper fork 3 is bifurcated into two lugs 15. Each front arm 10 is inserted between the two lugs 15 of the associated side member 3a, 3b and is mounted for pivotal motion about a pin 6 which extends between the lugs 15. Thus, each front arm 10 is disposed in a plane of the associated side member 3a, 3b of the upper fork 3. Each side member 3a, 3b of the upper fork 3 is formed into a closed box including front and rear, pipe like frame members 16 and 17, respectively, in and plate members 18 and 19 which cover the outer sides and inner sides, respectively, of the frame members 16, 17. Thus, each side member 3a, 3b of the upper fork 3 is substantially hollow.

A shock absorber 20 for producing a damping force against upward and downward movements of the front road wheel 14 has the upper end thereof pivotable about a pin 21 provided on the top of the upper fork 3. Thus, the shock absorber 20 is rockable forwardly and rearwardly in front of an upper portion of the upper fork 3. The shock absorber 20 includes, in combination, a spring 20a, and a hydraulic, or pneumatic, hydraulic and pneumatic damper 20b. A subtank 22 is provided from which buffer medium is supplied to the damper 20b, thus serving as a supplemental chamber for the damper 20b. The shock absorber 20 and each quadrilateral linkage 12 are interconnected by a second linkage comprising a rod 23, and a lever mechanism 24.

With respect to the front and rear arms 10, 11 constituting quadrilateral linkages 12, the front arm 10 has an end 10a which extends upwardly beyond the pin 6 and to which the lower end of the rod 23, having a turnbuckle construction of an adjustable length, is connected. The upper end of the rod 23 is connected to the rear end of a first rocking arm 25 comprising the lever mechanism 24. The base end of the first rocking arm 25 is joined to a pivot 26 to which the base end of a second rocking arm 28 is joined which in turn has the forward end thereof connected to the lower end of the shock absorber 20 by means of a pin 27. Thus, between the arm 10 of each quadrilateral linkage 12 and the lower end of the shock absorber 20, there is provided a second linkage defining a load transmission path having a load transmitting means including the rod 23 and the lever mechanism 24. It is to be noted that the rod 23 and the lever mechanism 24 are provided for each of the left and right side members 3a and 3b of the upper fork 3.

Figure 3:
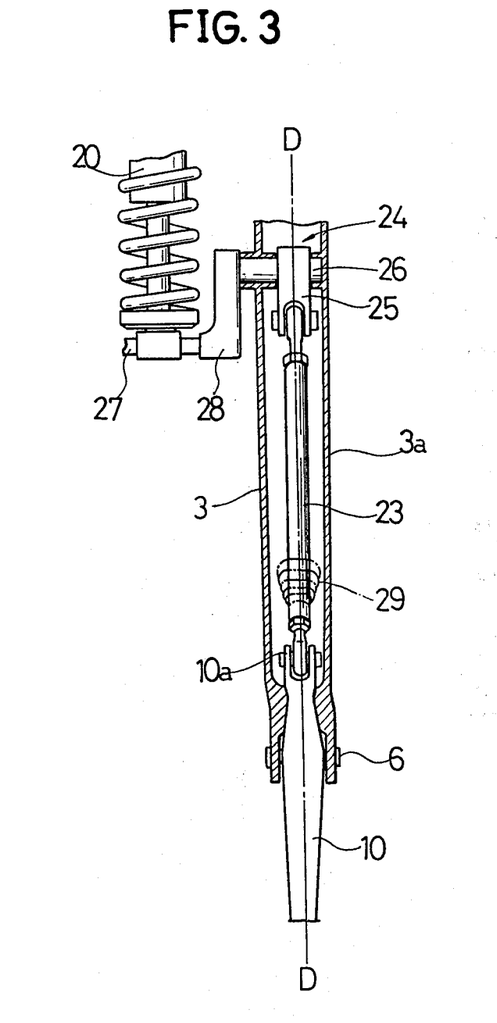
FIG. 3 is a partial enlarged sectional view showing an essential portion of an upper fork of the suspension of FIG. 1.

Referring now to FIG. 3, intermediate portion or pivot 26 of the lever mechanism 24 is extended into and supported by the hollow side member 3a of the upper fork 3 (the same applies also to the other side member 3b while description will be set forth only with respect to the side member 3a). The second rocking arm 28 is joined to that end of the pivot 26 which extends from the side member 3a towards the shock absorber 20. Meanwhile, the first rocking arm 25 is disposed within the side member 3a and joined to the pivot 26. Accordingly, the rod 23 is also disposed within the side member 3a and is connected to the first rocking arm 25. The lower end of the rod 23 is extended through an opening formed in the front face of the side member 3a to be exposed outside and the thus exposed lower extremity of the rod 23 is connected to a forward portion 10a of the arm 10. A rubber boot 29 having a bellows configuration is provided in a porting of the opening through which the rod 23 extends into the side member 3a. The rubber boot 29 assures back and forth movements of the rod 23 relative to the side member 3a while preventing dust and the like from entering within the side member 3a through the opening portion. Thus, the rod 23 and the first rocking arm 25 are protected from external matter.

The arrangement wherein the rod 23 and other components are inserted and accommodated in each side member 3a, 3b of the upper fork 3 as described above will allow the widthwise dimension in the leftward and rightward direction of the upper fork 3 including the rods 23 to be made smaller than that in an alternative possible design in which the rods 23 are disposed to extend along outside surfaces of the side members 3a, 3b. It will also allow reduction of the moment of inertia of the upper fork 3 when the handle bar 4 is turned to the left or right, and hence reduction in the moment of inertia of the entire front wheel suspension, corresponding to the displacement of the rods 23 to inner locations of the motorcycle body. Accordingly, the present invention provides a front wheel suspension preferable for a racing motorcycle.

Up and down movements of the front road wheel 14 following irregularities of the road are allowed by deformations of the above described quadrilateral linkages 12. Such deformations are effected by pivotal motions of the lower fork 5 around an instantaneous center which is a cross point A of extensions of axial lines of the front and rear arms 10, 11 which are disposed to converge downwardly rearwardly as shown in FIG. 1. Consequently, the transverse axle 13 for the front road wheel 14 is allowed to move up and down along a substantially straight line C—C which is substantially parallel to an axial line B—B which through the head pipe 2 and around which the handlebar 4 is operated to turn. Upon upward movement of the front road wheel 14, the front arms 10 are pivoted counterclockwise around the respective pins 6 to pull the rods 23 downwardly so that the first and second rocking arms 25, 28 are pivoted to compress the shock absorber 20, thereby causing a damping force to be produced. On the other hand, upon downward movement of the front road wheel 14, such operations are reversed and the front road wheel 14 is moved downwardly by the damping force of the shock absorber 20.

As will be apparent from the foregoing description, the rods 23 interconnecting the quadrilateral linkages 12 and the shock absorber 20 serve, upon upward movement of the front road wheel 14, as pull rods which are acted upon by tensile forces in axial directions when the shock absorber 20 is compressed to produce a damping force. Because each rod 23 is disposed within the associated hollow side member 3a, 3b of the upper fork 3, the arm 10 and the rod 23 can be arranged on the same vertical axial line D—D for connection therebetween as shown in FIG. 3, in other words, an offset arrangement between the arm 10 and the rod 23 as would be required where the rod 23 such is disposed to extend along the outer surface of the side member 3a, 3b, is eliminated. Thus, according to the arrangement of the present invention, the load transmission path including the arm 10 and the rod 23 is coplanar and such coplanar arrangement improves the strength and rigidity of the load transmission path.

Referring again to FIG. 1, it can be seen that the subtank 22 forming a supplemental chamber for the damper of the shock absorber 20 is mounted forwardly of an upper part of the upper fork 3, that is, on the left side of the shock absorber 20 as viewed in FIG. 1, and hence the shock absorber 20 is minimized in size and weight corresponding to the volume of the subtank 22. Buffer medium such as oil, gas, and so on, is enclosed and filled in the subtank 22 and is supplied therefrom to the damper of the shock absorber 20 by means of a pipe member 31 which is made of a flexible material.

Figure 4:
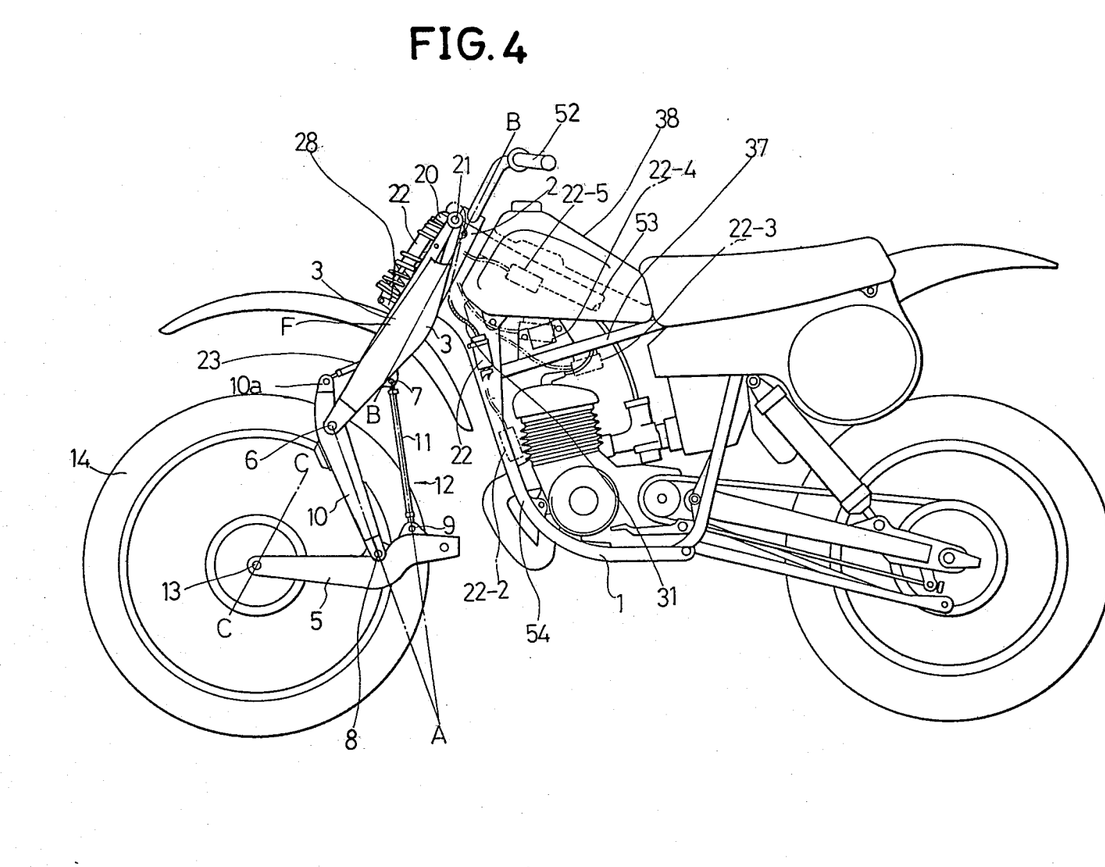
FIG. 4 is a representation illustrating various locations at which a subtank for a shock absorber of the suspension of FIG. 1 may be provided.
Figure 6:
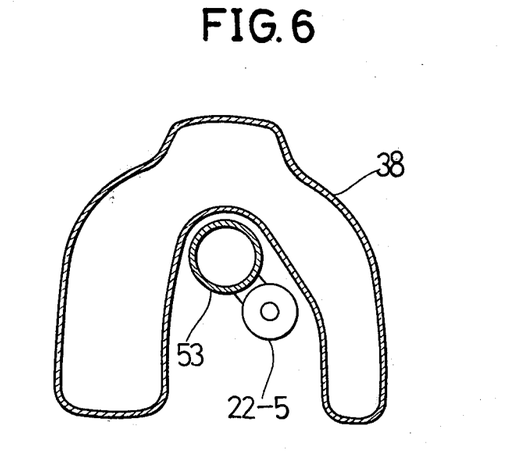
FIG. 6 is a sectional view showing the subtank of FIG. 4 disposed in a position below a fuel tank.

FIG. 4 shows an exemplary motorcycle in which the subtank 22 is mounted on the motorcycle body structure in order to attain further reduction in the moment of inertia around the axis of rotation of the handlebar and further simplification and favorable appearance of the motorcycle. In FIG. 4, the subtank 22 as shown in solid line is mounted on an upper portion of a down tube 54 which is an element of the body structure. Accordingly, while the shock absorber 20 is mounted on the upper fork 3, the handlebar structure is correspondingly reduced in weight and the moment of inertia when the handlebar 4 is turned to direct the motorcycle to the right or left is also reduced. It is to be noted, however, that the subtank 22 may be mounted at any desired arbitrary location on the body structure. FIG. 4 illustrates various second to fourth exemplary mounting locations such as at 22-2, 22-3, 22-4, and 22-5 on the motorcycle body, all shown in dot and dash lines. Thus, the subtank 22 may be mounted at the second location 22-2 in the mid portion of the down tube 54 along the length in the vertical direction, at the third location 22-3 on a cross pipe 37, at the fourth location 22-4 below a fuel tank 38, or at the fifth location 22-5 on a main pipe 53 outside of which the fuel tank 38 is disposed in a crossing manner as shown in FIG. 6.

Figure 5:
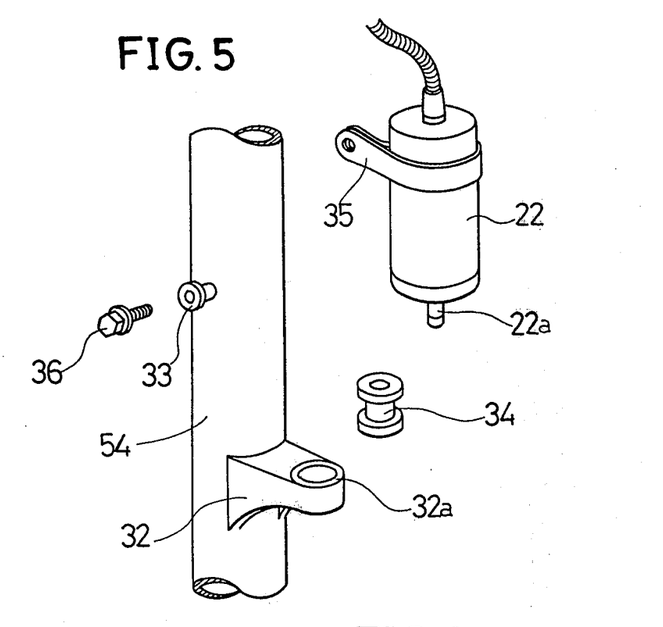
FIG. 5 is a fragmentary perspective view showing how the subtank of FIG. 4 is to be assembled.

FIG. 5 is an enlarged view which illustrates how the subtank 22 is mounted on the down tube 54. The down tube 54 has a stay 32 formed to extend therefrom and further has a nut member 33 located above the stay 32 and extended outwardly from the down tube 54. A stepped tubular receiving seat 34 made of an elastic material such as rubber is fitted in a cup portion 32a of the stay 32 and receives therein a projection 22a which is provided on the bottom of the subtank 22 so as to serve as a pressure regulating valve. A bank 35 is wound on the outer periphery of an upper part of the subtank 22. Both opposite ends of the band 35 are overlapped and applied to the nut member 33, and a bolt 36 is screwed into the nut member 33 to thereby fasten the band 35. The subtank 22 is thus securely fastened to the down tube 54. The subtank 22 may, of course, be mounted by some other suitable means.

Figure 7:
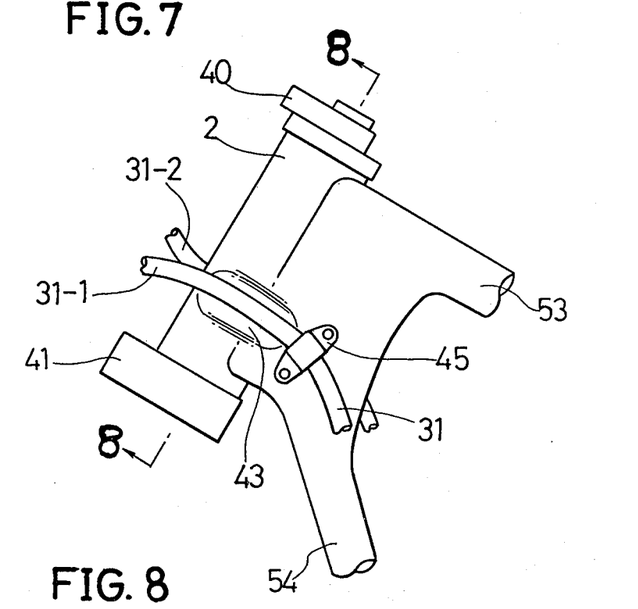
FIG. 7 is a partial enlarged view showing an application of a pipe member of the subtank of FIG. 4.
Figure 8:
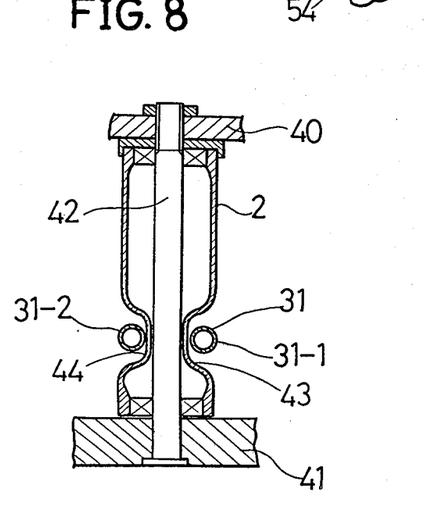
FIG. 8 is a vertical sectional view taken along line 8-8 of FIG. 7.

FIGS. 7 and 8 illustrate a piping arrangement of the aforementioned pipe member 31 which interconnects the shock absorber 20 provided on the handlebar structure and the subtank 22 provided on the body structure. The upper fork 3 has a top bridge 40 and a bottom bridge 41 secured thereto. A steering shaft 42 which interconnects both bridges 40 and 41 is extended through the inside of the head pipe 2 which provides the center axis around which the handlebar structure is turned. The head pipe 2 has a pair of inward depressions 43 and 44 formed on opposite left and right sides thereof. Two pipe members 31-1 and 31-2 providing going and coming paths for buffer medium are received in the depressions 43 and 44, respectively, and fastened to the body structure by means of fastening members 45.

According to this piping arrangement, because the pipe members 31 are disposed near the center of the head pipe 2, the displacement and flexure of the pipe members 31 when the handle structure is turned to the left or right around the head pipe 2 can be optimally minimized. The pipe members 31 can be disposed in an independent relationship from operations of the handlebar, and hence they can be maintained in a substantially fixed position.

As will be apparent from the foregoing description, if the above mounting arrangement is employed jointly, the weight and hence the amount of inertia of the handlebar structure can be reduced by mounting the subtank on the motorcycle body structure. Besides, due to the presence of the subtank, the volume of the shock absorber which is provided on the handlebar structure can be reduced and hence the shock absorber can be made small and light-weight, and the weight and the moment of inertia of the handlebar structure can be further reduced thereby.

Additionally, because the pipe members disposed between the handlebar structure and the body structure and interconnecting the shock absorber and the subtank are received in the respective depressions formed in the head pipe providing the center axis around which the handle structure is turned, the pipe members are displaced or flexed very little when the handle is operated to be turned. Thus, the pipe members can be disposed so as to remain in respective substantially fixed positions.

I claim:

1. A front wheel suspension for a motorcycle, comprising:

a pair of quadrilateral first linkages including a pair of upper fork members pivotably supported so as to be steerable on a body of said motorcycle, a pair of lower fork members rotatably supporting a front wheel of said motorcycle, and a pair of front link members and a pair of rear link members interconnecting said upper and lower fork members;

a shock absorber disposed between said upper fork members;

a pair of second linkages each including at least one rod member and operatively connecting one end of said shock absorber to either of said first linkages;

said upper fork members each having a hollow portion accommodating therein at least a part of either of said second linkages;

each said second linkage comprising said rod member having one end thereof jointed to a link member of one pair of said front and rear pairs of link members, and a lever member connecting the other end of said rod member with said one end of said shock absorber;

said lever member including an intermediate portion pivotably supported on said upper fork member, a first arm portion having one end thereof joined to said intermediate portion and the other end thereof connected to said other end of said rod member, and a second arm portion having one end thereof joined to said intermediate portion and the other end thereof connected to said one end of said shock absorber; and said rod member and said first arm portion being substantially accommodated in said hollow portion of said upper fork member.

2. A suspension according to claim 1, wherein: each of said upper fork members has at least one opening formed therein substantially in the longitudinal direction of said motorcycle; and each said rod member of each said second linkage is adapted to extend through said opening of each said upper fork member.

3. A suspension according to claim 2, wherein: a cover of a bellows type is provided between said opening of each said upper fork member and each said rod member.

4. A suspension according to claim 1, wherein: said rod member and said first arm portion of said lever member are disposed, so as to be substantially coplanar with respective component members of said first linkage.

5. A suspension according to claim 1, wherein:
said one pair of said front and rear pairs of link members comprises said pair of front link members.

* * * * *